Dec. 9, 1958   R. F. ANDERSON ET AL   2,863,271
CUP FILLER AND CAPPER
Filed Nov. 16, 1956   6 Sheets-Sheet 3
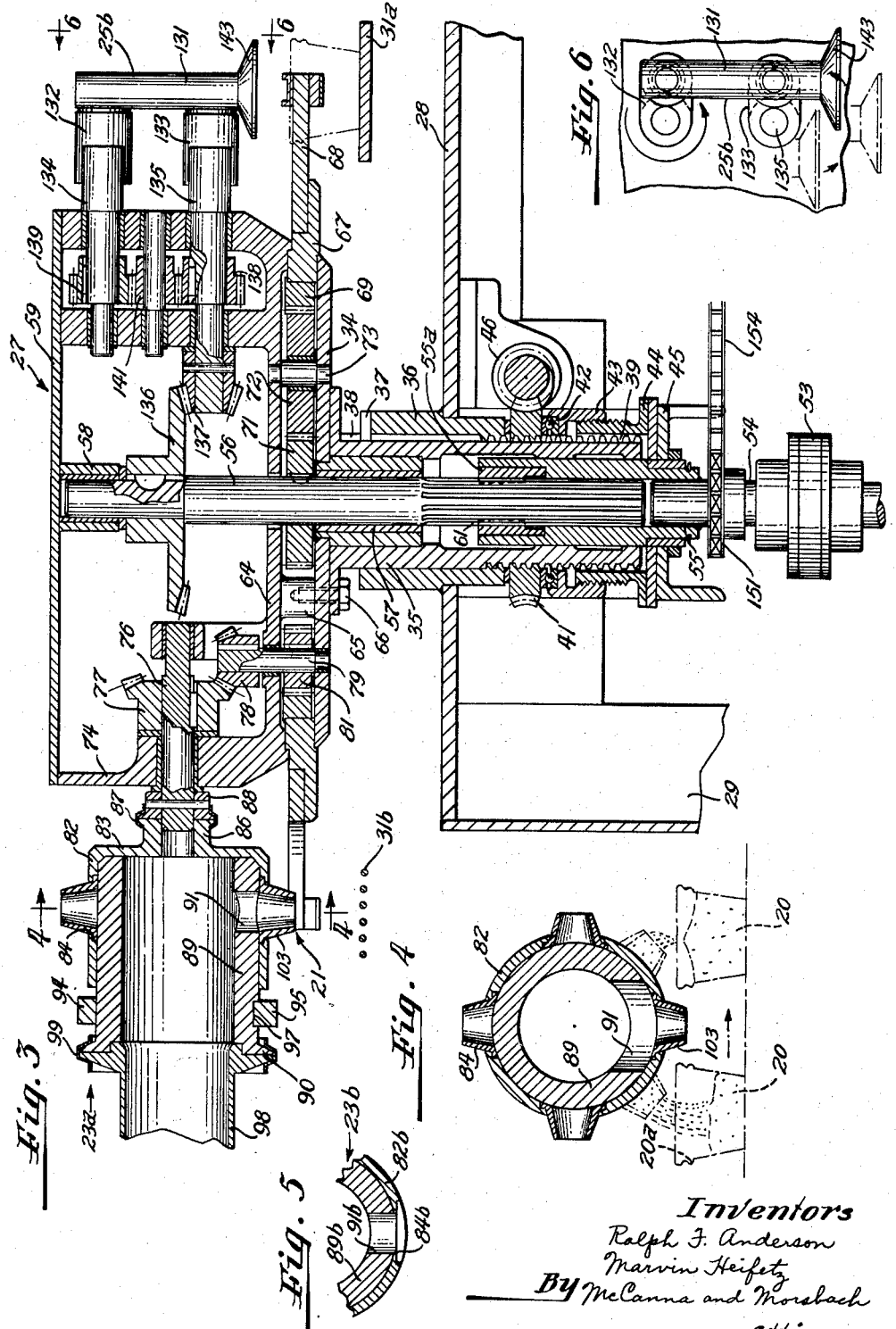
Inventors
Ralph F. Anderson
Marvin Heifetz
By McCanna and Morsbach
Attys.

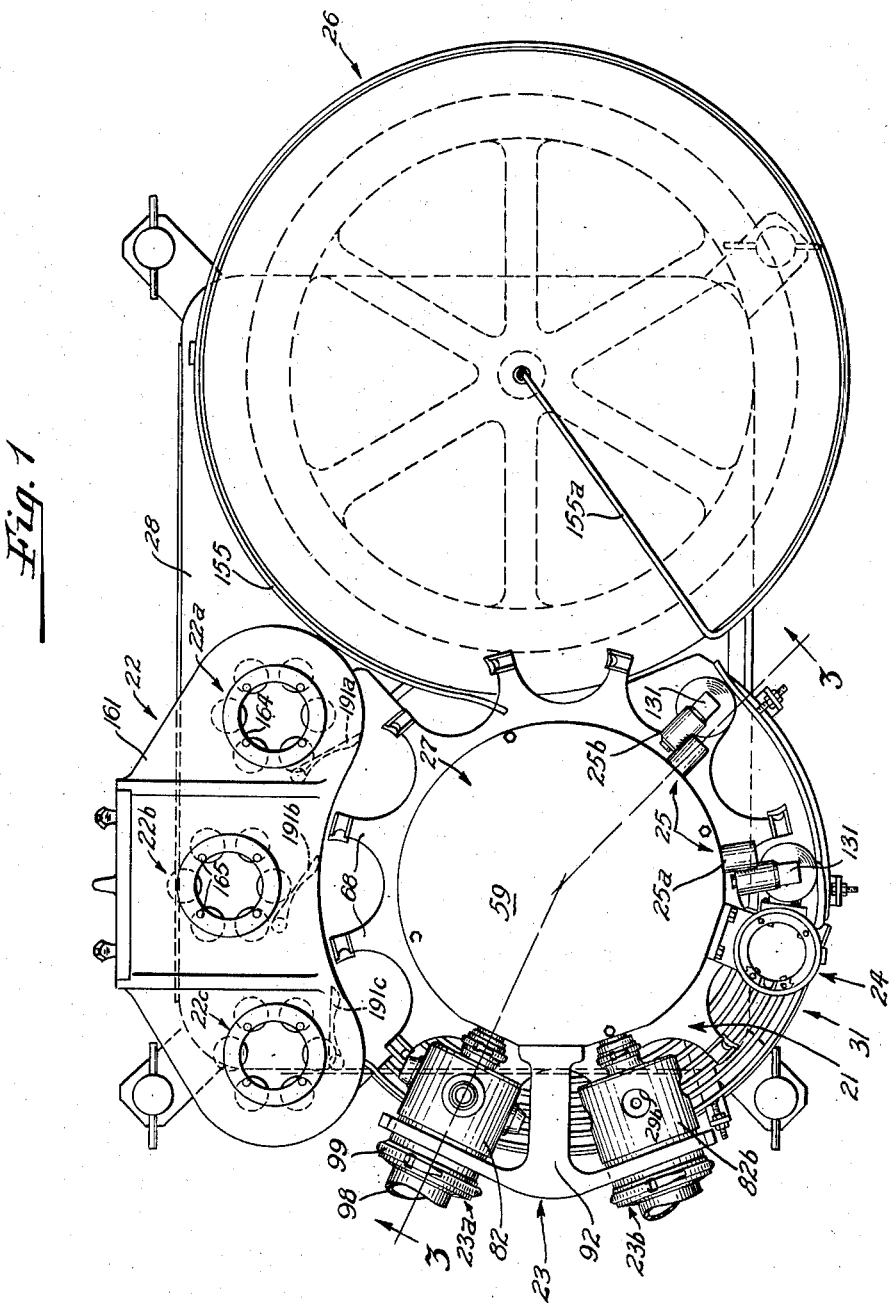

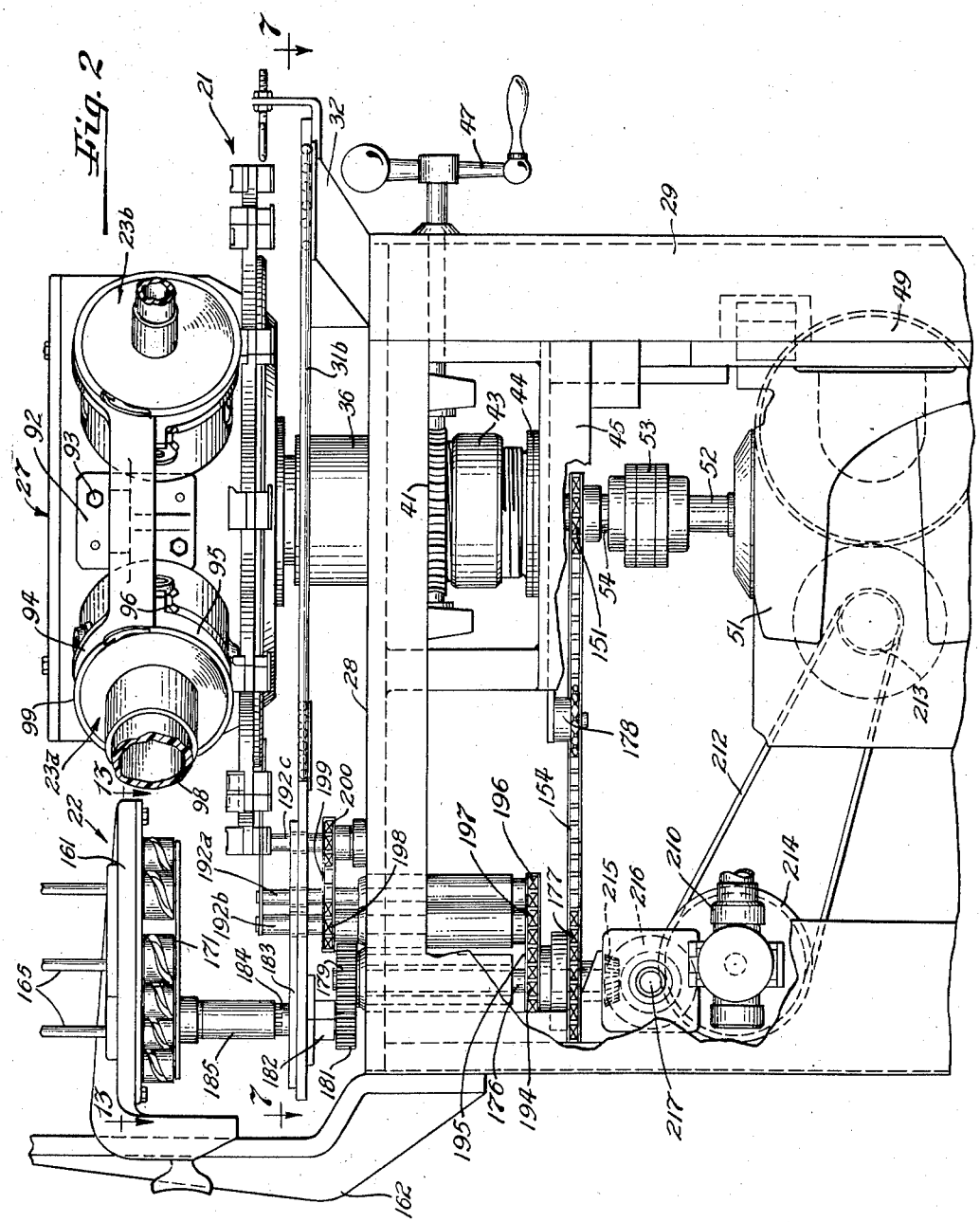

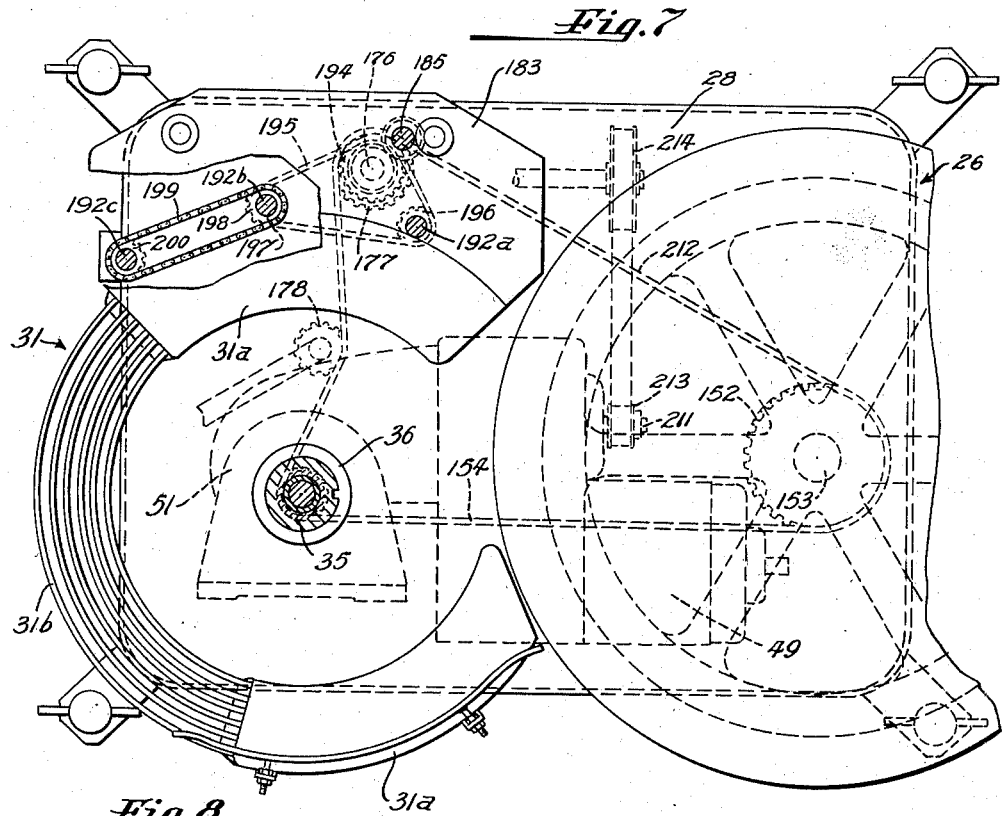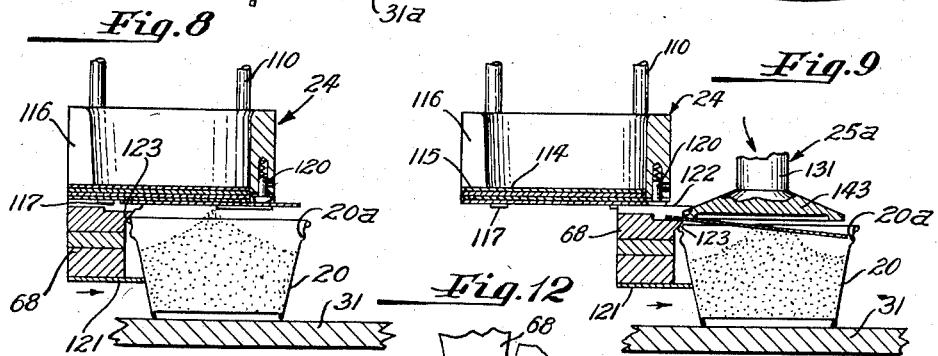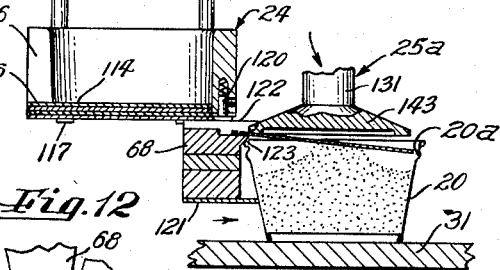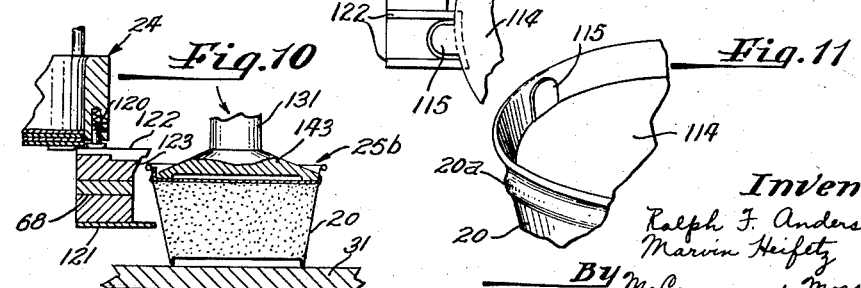

Dec. 9, 1958   R. F. ANDERSON ET AL   2,863,271
CUP FILLER AND CAPPER
Filed Nov. 16, 1956   6 Sheets-Sheet 5

Inventors
Ralph F. Anderson
Marvin Heifetz
By McCanna and Morsbach
Attys.

Dec. 9, 1958  R. F. ANDERSON ET AL  2,863,271
CUP FILLER AND CAPPER
Filed Nov. 16, 1956  6 Sheets-Sheet 6
Fig. 15
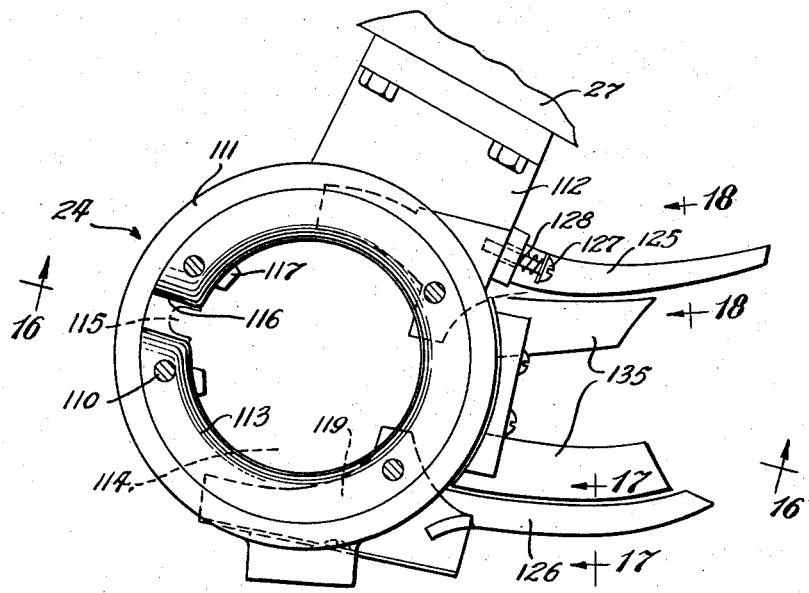
Fig. 16
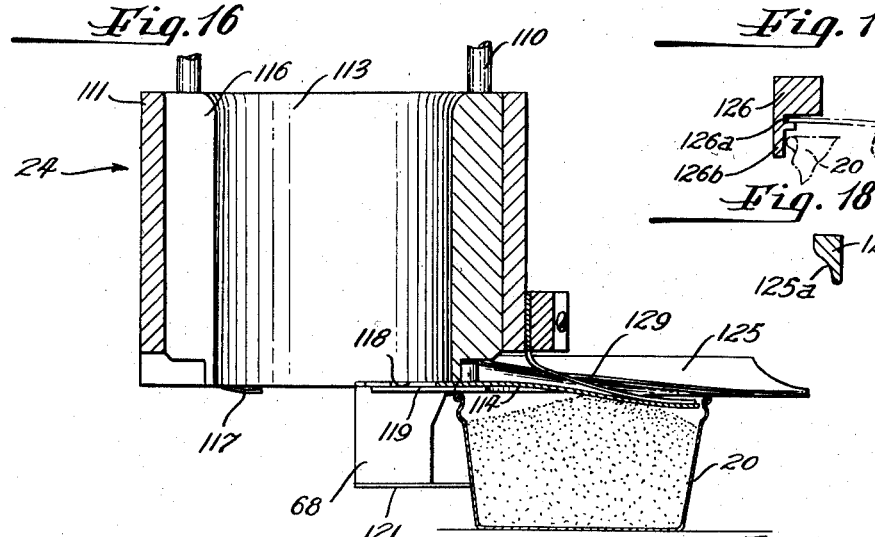
Fig. 17
Fig. 18
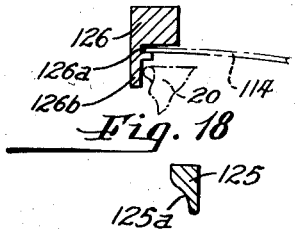
Inventors
Ralph F. Anderson
Marvin Heifetz
By McCanna and Morsbach
Attys.

2,863,271
CUP FILLER AND CAPPER

Ralph F. Anderson and Marvin Heifetz, Rockford, Ill., assignors to Ralph F. Anderson Application November 16, 1956, Serial No. 622,677

20 Claims. (Cl. 53—276)

This invention relates to novel and useful improvements in filler mechanisms, and particularly to a filler machine in which the containers are continuously advanced and the filling and capping operations effected while the containers are moving.

Various important objects of this invention are to provide an improved apparatus which is arraged to dispense, fill and cap containers at a very high rate; which is compact and takes up a minimum of space; and which is readily adjustable to accommodate containers of different sizes.

A more particular object of this invention is to provide a filler mechanism including an annular conveyor, a housing disposed centrally of the conveyor, a filler and a capping mechanism mounted on the housing at circumferentially spaced points around the conveyor, and a mechanism disposed within the housing for operating the filler and capper mechanisms in timed relation with the advance of the conveyor.

Another object of this invention is to provide an improved construction and mounting for the filler mechanism on the housing to facilitate removal and disassembly of the filler for cleaning.

A further object of this invention is to provide an improved filler mechanism arranged to dispense material into the containers as they are continuously advanced past the filler and which is particularly adapted to handle semi-solid comestibles such as ice cream and the like.

Yet another object of this invention is to provide an improved apparatus for dispensing and applying covers to a container as they are sequentially advanced past the cover dispenser and the cover applying mechanism.

These, together with various ancillary objects and advantages of this invention will be more readily appreciated as the same becomes better understood by reference to the following detailed description when taken in connection with the accompanying drawings wherein:

Figure 1 is a top plan view of the filling machine;

Figure 2 is an end elevational view of the filling machine with parts broken away to illustrate details of construction;

Figure 3 is a vertical sectional view through the filling machine taken on the plane 3—3 of Figure 1;

Figure 4 is a transverse sectional view taken through one of the rotary filler valves on the plane 4—4 of Fig. 3;

Figure 5 is a fragmentary transverse sectional view through the other of the rotary filler valves;

Figure 6 is a fragmentary side elevational view of the cap applying mechanism taken on the planes 6—6 of Fig. 3;

Figure 7 is a horizontal sectional view of the filling apparatus taken on the plane 7—7 of Fig. 2;

Figures 8, 9 and 10 are diagrammatic views illustrating the sequential steps of removing a cover from the magazine and applying a cover to the container;

Figure 11 is a fragmentary perspective view of a container having a cover applied thereto;

Figure 12 is a fragmentary top plan view of the cover stripping arm on the container carrier;

Figure 15 is a top plan view of the cover magazine;

Figure 16 is a vertical sectional view through the cover magazine taken on the plane 16—16 of Fig. 15;

Figure 17 is a fragmentary sectional view taken on the plane 17—17 of Fig. 15; and Figure 18 is a fragmentary sectional view taken on the plane 18—18 of Figure 15.

Figure 13:
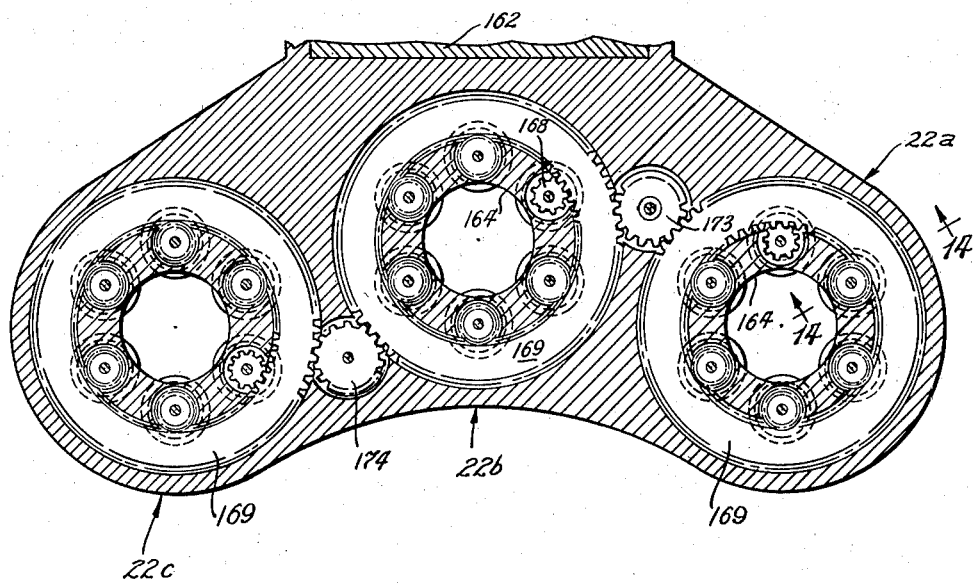
Fig. 13 is a fragmentary horizontal sectional view through the container dispensers, taken on the plane 13—13 of Fig. 2.

The container filling apparatus of the present invention is arranged to fill and cap the containers 20 as they are continuously advanced and as best shown in Figure 1 includes a conveyor 21 for continuously advancing the containers, a container dispensing mechanism 22 for feeding containers to the conveyor, a filler mechanism 23 arranged to fill the containers while the latter are in motion, a cover dispensing mechanism 24, and a cover applying mechanism 25 arranged to apply the covers to the containers while the containers are in motion. An auxiliary conveyor, herein shown in the form of a turntable 26, is provided for receiving the filled and capped containers.

In accordance with the present invention, the conveyor 21 is made annular in form and the filler, the cover dispenser and the cap applying mechanism are mounted on a housing 27 disposed centrally of the conveyor, the various instrumentalities on the housing being driven by mechanism disposed within the housing. As best shown in Figure 3, the central housing 27 is nonrotatably mounted on a support frame including a table 28 and depending legs 29. An annular container supporting platform underlies the conveyor 21 and, for reasons set forth more fully hereinafter, includes an imperforate portion 31a which underlies the cap applying mechanism 25 and the container dispensing mechanism 22, and a relatively open portion 31b, herein shown formed of a plurality of spaced bars, which open portion underlies the filling mechanism 23. The container supporting platform, in the embodiment herein shown, is fixedly mounted as by brackets 32 (see Fig. 2) on the table 28 and the housing, carrying the conveyor, filler, cap dispensing mechanism, and the cap applying mechanism is arranged for vertical adjustment with respect to the container support platform.

As best shown in Figure 3, the central housing 27 incldes a base plate 34 which is attached to the upper end of an inner sleeve 35, which inner sleeve is slidably mounted in an outer sleeve member 36 affixed to the table 28. A key 37 is provided on the outer sleeve 36 and arranged to extend into a keyway 38 in the inner member 35 to prevent relative rotation therebetween. Provision is made for selectively adjusting the inner sleeve relative to the outer sleeve and for this purpose the inner sleeve is provided with an internally threaded lower portion 39. An internally threaded pinion gear 41 is disposed on the threaded portion 39 of the inner member and is rotatably supported on bearings 42 carried by an adjusting collar 43. The collar is threaded to a flanged fitting 44 which is rigidly secured to a cross-member 45 disposed below the table 28 and rigidly secured thereto. A worm gear 46 meshes with the pinion 41 and is arranged to be rotated by means of a handle 47 (see Fig. 2) to effect selective raising and lowering of the housing 27 relative to the container support platform.

The various instrumentalities on the filling machine are driven by means of a motor 49 and speed reducing mechanism 51 (see Fig. 2), mounted on the legs of the support frame. The speed reducing mechanism 51 has a vertically disposed take-off shaft 52 which is connected by means of a coupling 53 to a stub shaft 54. As is clearly shown in Figure 3, the stub shaft 54 is secured to a sleeve 55 having an internally splined portion 55a, which sleeve is rotatably journaled in the cross member 45 and extends upwardly into the internal sleeve 35. A shaft 56 is rotatably supported intermediate its ends in a bearing 57 carried by the internal sleeve 35 and at its upper end in a bearing 58 carried by the top wall 59 of the central housing 27, the shaft 56 has an externally splined lower end 61 arranged to slidably extend into the internally splined portion of the sleeve 55. As is apparent, the shaft 56 telescopes in the internally splined portion 55a of the sleeve 55 as the housing 27 is raised and lowered. Mechanism is provided within the housing 27 for drivingly connecting the shaft 56 to each filler, the conveyor and the capping mechanism to drive the latter in timed relation with each other.

The housing 27 is formed with a bottom wall 64 which is spaced from the bases plate 34, as by bosses 65, and is rigidly secured thereto as by fasteners 66. The conveyor 21 is in the form of an annular ring 67 which is rotatably supported between the base plate 34 and the bottom wall 64 of the housing and is provided with a plurality of circumferentially spaced teeth 68 on the outer periphery thereof defining spaced container receiving pockets. An internal gear 69 is secured to the ring 67 and is drivingly connected to the gear 71 on the shaft 56 by means of an idler gear 72 journaled on a stub shaft 73 which is supported in the base plate 34 and bottom wall 64. In the embodiment illustrated, the motor is arranged to drive the shaft 56 in a clock-wise direction so that the conveyor 67 is rotated in a counter-clockwise direction, as viewed in Figure 1.

The housing 27 includes a peripheral side wall 74 which extends completely therearound and encloses the drive mechanism within the housing. A plurality of shafts are rotatably journaled in the side wall and extend horizontally therethrough for driving the filler mechanism and the cap applying mechanism.

The filler mechanism 23 of the present invention is arranged to dispense either a single material or several different materials into the containers as they are advanced by the conveyor. In the specific form illustrated a pair of fillers 23a and 23b are provided, which fillers are respectively arranged to dispense a semi-solid comestible such as ice cream or the like into the containers and a flavoring such as a syrup or the like on top of the ice cream in the containers. The fillers 23a and 23b are mounted on the housing at certain circumferentially spaced points therearound and arranged to perform their respective filling operations as the containers are advanced therebelow. The fillers 23a and 23b are generally similar in construction and, as shown in Figure 3, are each driven by a shaft designated by the nueral 76 which is journaled in the side wall 74 of the housing and projects outwardly therefrom. These shafts are rotated in timed relation with the conveyor by means of bevel gears 77 and 78 which are respectively mounted on the shafts 76 and 79. The last mentioned shaft is rotatably supported in the botom wall 64 and in the base plate 34 of the housing and has a pinion 81 secured thereto between the bottom wall and the base plate, which pinion meshes with the ring gear 69 on the conveyor to thereby effect rotation of the shaft 76 in timed relation with the conveyor. The fillers 23a and 23b are constructed and mounted on the housing in such a manner as to facilitate easy removal and disassembly of the fillers to permit cleaning of the latter. As best shown in Figure 3, the filler 23a comprises an outer cup shaped member 82 having a plurality of circumferentially spaced discharge ports 84 formed therein. The outer valve member 82 is open at one end thereof and has a wall 83 formed on the other end. A flanged boss 86 is formed on the wall 83 and is detachably connected by means of a split ring clamp assembly 87 to a flanged couping member 88 pinned to the outer end of the shaft 76. The split clamp assembly 87 is of conventional construction and includes a latch member (not shown) which is pivoted to one end of the split ring and connected by means of a bail to the other end of the split ring whereby the latch member is arranged to draw the ends of the ring together and firmly clamp the flanged boss 86 on outer valve member to the coupling 88. The outer valve member 83 is open at its outer end and an inner valve member 89 extends into the outer valve member. The inner valve member has a discharge port 91 formed in the under side thereof and is non-rotatably supported on the housing 27 by means of a generally T-shaped bracket 92. As best shown in Figure 2, the bracket 92 is secured as by fasteners 93 to the housing and has semi-circular yokes 94 formed adjacent the free ends of the cross arm. An arcuate clamp 95 is detachably secured to the yoke 94, as by wing nuts 96, to thereby releasably clamp the inner valve member to the bracket 92. As shown in Figure 3, the arcuate clamp 95 extends into a recess 97 formed in the inner valve member to thereby constrain the latter against axial sliding and rotary movement.

The inner valve member 89 is open at the radially outer end thereof and has a flange 90 formed therearound. Material to be dispensed is supplied to the inner valve member by way of a conduit 98, which conduit 98 has a flange formed at the end thereof arranged to be detachably clamped to the inner valve member 89 by a split ring type clamp assembly 99.

The first filler valve 23a is specifically designed for dispensing semi-solid material such as ice cream and the like and is arranged to substantially completely fill the receptacle or container 20 as it is advanced thereby. In particular, the discharge port 91 in the inner valve member is circumferentially elongated so that the discharge passage 84 in the outer valve member begins to register with the discharge port inner valve member before the container is directly below the filler valve. In order to direct the semi-solid material into the container, an annular lip or nozzle 103 is provided on the outer valve member around each of the discharge openings. The lips 103 are frusto-conically shaped, as shown in Figures 3 and 4, to minimize dripping therefrom when the flow through the lips is cut off and are preferably removably mounted on the outer valve member to permit interchanging with nozzles having different size passages therewith. In the embodiment illustrated, the nozzles have a flange on the inner end thereof and removably retained in position in the discharge passages 84 by the cylindrical inner valve member 89.

The ice cream is generally formed in a continuous type freezer, and, as formed, contains an appreciable quantity of air. In order to maintain the uniform consistency of the ice cream, as it leaves the continuous freezer, it is desirable to prevent interruptions in the flow of ice cream which would adversely effect its uniform consistency. For this reason, the arcuate length of the discharge port 91 is preferably correlated with the angular spacing between the discharge passages in the outer valve member so that one or more discharge passages in the outer valve member at all times register with the discharge port 91 to provide substantially continuous and uninterrupted flow of ice cream therefrom. In addition, the spacing between the containers 20 on the conveyor is made such that a succeeding container moves into position to receive material dispensed through a succeeding pouring lip 103 before the immediately preceding container moves out of position to receive material dispensed through the pouring lip on the preceding nozzle. With this arrangement, one of the pouring lips, shown in dotted lines to the left of center in Fig. 4, begins to register with the discharge port 91 and convey material into a container 20 therebelow before the preceding pouring lip, shown in dotted lines to the right of center in Fig. 4, moves out of registry with the discharge port 91. Thus, during a portion of each cycle, the filler valve is dispensing into two separate containers. As the individual containers are moved to a position directly below the filler valve, the pouring lip 103 extends downwardly into the container to thereby cause the material dispensed therethrough to spread outwardly in the container and more evenly fill the same.

The other filler valve 23b shown in the drawings is constructed and driven in generally the same manner as the aforedescribed filler valve 23a. In the specific embodiment shown, however, the filler valve 23b is specifically designed to dispense syrups and similar materials and the port and passage arrangement of the inner and outer valve members has been modified to adapt the same to this use. The inner valve member 89b of the filler valve 23b has a discharge port 91b formed in the under side thereof and the outer valve member 82b has a discharge passage 84b formed therein. In order to minimize dripping of the relatively thin syrups dispensed through the filler valve 23b, the outer face of the valve member 82b is counterbored adjacent each of the discharge passages 84b to provide a relatively sharp edge. With this arrangement, substantially no syrup remains in the discharge passage 84b when the outer valve member moves out of registry with the port 91b and thereby provides a sharp cut off of the flow of syrup. Since only a relatively small quantity of syrup is dispensed into each container, the port 91b is made relatively smaller than the corresponding port in the filler valve 23a.

The containers 20 are advanced along the container support platform 31 by the teeth on the conveyor from a position below the filler valves past a cap dispensing mechanism 24 to the capping apparatus 25. As best shown in Figs. 15–17, the cap dispensing mechanism 24 includes an outer sleeve 111 supported by an arm 112 on the side wall of the housing 27 for vertical adjustment therewith with respect to the container support platform 31. An inner sleeve 113 is disposed within the outer sleeve and has a plurality of rods 110 affixed to the upper end thereof to define a magazine for the covers. The magazine is arranged to handle disc type covers 114 each having an integral withdrawal tang 115 and for this purpose the inner sleeve 113 is formed with an upwardly flared slot 116 for reception of the withdrawal tangs. A pair of inwardly extending fingers 117 are provided at the opposite sides of the slot 116 to support one side of the lowermost cover in the stack of covers. The inner sleeve 113 is also formed with a recess 118 in the lower edge thereof, at the side opposite the slot 116, which recess has a depth substantially equal to the thickness of one of the disc type covers to permit passage of the lowermost cover therethrough. Plates 119 are attached to the lower end of the outer sleeve 111 and extend inwardly of the central opening in the inner sleeve, to support the other side of the stack of covers. As is apparent, the plates 119 underlie the recess 118 in the inner member and define a slot between through which the lowermost cover can be moved. A spring biased plunger 120 (see Figs. 8 and 9) is mounted in the inner sleeve and is arranged to move upwardly to permit sliding of the lowermost cover thereby while engaging the edge of the adjacent cover to prevent dispensing of more than one cover at a time.

As best shown in Figures 8–10 and 16, the teeth 68 on the conveyor are each provided with an arcuate pusher plate 121 arranged to engage a container 20 and advance the same along the container support platform 31. In accordance with the present invention, the teeth 68 are also arranged to strip the lowermost cover from the stack of covers in the magazine 24 and deposit the cover on the container as it is moved along the support platform. For this purpose, the upper face of each of the teeth 68 is slotted to provide spaced stripper fingers 122 which engage the edge of the lowermost cover in the stack at opposite sides of the withdrawal tang on the cover. An anvil 123 is formed on each of the teeth between the stripper fingers 122 and is arranged to overlie the upper edge of the container as it is advanced by the pusher plate 121 on the teeth.

The covers and containers are guided into interfitting relation by means of arcuate arms 125 and 126 attached to the cover magazine and extending therefrom in the direction of movement of the containers along the conveyor. In order to accommodate oversize containers, the arm 125 is resiliently mounted to permit lateral deflection of this arm, and as shown in Figure 15 is supported by means of a pin and spring 127 and 128 respectively. The pin extends through a transversely elongated slot in the flanged inner end of the arm 125 and into the mounting arm 112. Resilient fingers 129 are attached to the outer sleeve 111 and extend downwardly and forwardly in the direction of movement of the containers to resiliently press the covers onto the containers as the containers are advanced thereby. As is apparent from Figures 9 and 16, the withdrawal tang on the detached covers are supported on the anvil 123, the covers slanting downwardly therefrom into the containers. The arm 126 is formed with a groove 126a which registers with the recess 118 in the cover dispenser, which groove extends part way along the length of the arm and terminates in spaced relation to the free end thereof. The groove is arranged to receive one edge of the cover as it is moved off the stack by the stripper fingers 122 to support and guide one edge of the cover. A depending flange 126b extends downwardly from the arm for engagement with the side of the rolled upper edge of the containers to guide the latter as they are moved by the pusher plate 121 on the conveyor teeth 68. The other arm 125 is recessed on the lower portion of the inner face to provide a depending guide flange 125a for laterally guiding the cover and the upper edge of the containers as they are advanced by the stripper fingers 122 and the pusher plate 121, respectively. The depth of the recess decreases in a direction toward the free end of the arm so that arm 125 tends to cam the cover downwardly onto the container therebelow.

After the containers have advanced past the cover magazine 24 and have a cover loosely deposited thereon, the containers are moved past a cap applying mechanism 25 which seats the cover on the container. Some air is generally trapped between the cover and the container, as the former is seated on the container, which air tends to force the cover upwardly after the pressure on the cover is released, thereby providing a faulty seal between the cover and the container. In order to overcome this difficulty, the cover is first lightly pressed onto the container to thereby expel the major portion of the air and permit that air which is entrapped below the cover to escape, the cover thereafter being permanently seated on the container. In addition, provision is made for bending the withdrawal tab on the cover, prior to seating of the cover on the container, to thereby prevent distortion of the container as the cover is pressed thereon.

More particularly, the pair of plungers designated 25a and 25b are mounted on the housing 27 at circumferentially spaced points therearound. The plungers 25a and 25b each include a vertically disposed stem 131 which is rotatably attached to spaced eccentrics 132 and 133. The eccentrics are attached to vertically spaced shafts 134 and 135 which, as shown in Figure 3, extend horizontally through the side walls 74 of the housing and are rotatably supported therein. One of the shafts such as 135 is driven from the central shaft 56 in the housing 27 by means of a bevel gear 136 mounted on the shaft 56, which last mentioned bevel gear meshes with a gear 137 on the shaft 135. The shaft 135 is rotated in a counterclockwise direction, as viewed in Figure 6, and has a gear 138 thereon which drives the gear 139 on the shaft 134 through the idler gear 141. The shafts 134 and 135 are rotated in unison with each other and support the stem 131 in an upright position while rotating the latter in a counterclockwise direction through a circular path. A head 143 is provided on the lower end of each of the stems 131 and is arranged to engage the cover on the container as the latter moves thereby. As is apparent, the heads 143 are simultaneously moved downwardly and in the direction of movement of the containers, as the latter are advanced thereby, to thereby effect the capping operation without interrupting the advance of the containers.

The first plunger 25a is arranged to press the cover lightly into the container and also bend the withdrawal tang on the cover prior to the insertion of the latter into the container. This plunger is located closely adjacent the cover dispensing mechanism 24 and is arranged to engage the covers as they move away from the guide arms 125 and 126. As shown in Figure 9, the withdrawal tang on the cover is supported on the anvil 123. The plunger 25a is arranged to move downwardly in a circular path and in a direction such that the plunger also moves in the direction of movement of the containers as the plunger engages the covers. The plunger moves into closely spaced adjacency to the anvil and thereby bends the withdrawal tang on the cover upwardly as the cover is pressed by the plunger downwardly into the container. The head 143 on the plunger 25a is so arranged that, in the lower limits of its travel, the lower edge of the head 143 extends only slightly into the container and is spaced appreciably above the seating groove 10a formed in the container. Consequently, the air which is entrapped between the cover and the container may escape past the cover as the cover and container are moved from a position below the plunger 25a to a position below the plunger 25b. As the container is further advanced to a position below the plunger 25b, the latter moves downwardly in a circular path and in a direction such as to move with the container, and as shown in Figure 10, firmly presses the cover into the groove 20a in the container.

The containers, after being filled and capped, are deposited on the rotary turntable 26. As best shown in Figure 7, the imperforate portion 31a of the container support platform is cut away and the rotary turntable extends into a position underlying the conveyor 21. The turntable is rotatably supported on the frame and has the upper surface thereof disposed coplanar with the container support platform 31a. The turntable 26 is rotated in a clockwise direction as viewed in Figure 7, in timed relation with the conveyor, and for this purpose sprockets 151 and 152 are provided on the stub shaft 54 and the turntable support shaft 153 respectively and a chain 154 is provided to drivingly interconnect these sprockets. The filled and capped containers are removed from the conveyor 21 by a stationary guide bar 155 which extends into the path of advance of the containers on this conveyor and extends therefrom around the periphery of the turntable 26 to retain the containers thereon. A portion 155a of the guide bar 155 extends radially into the center of the turntable to prevent movement of the containers on the turntable back into the path of movement of the conveyor 21.

Figure 14:
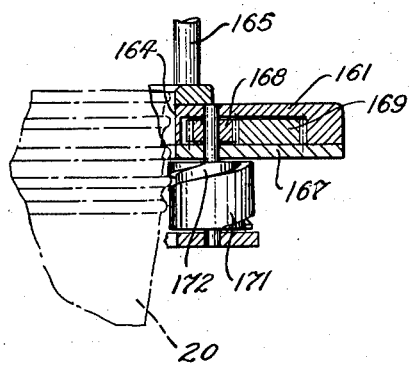
Figure 14 is a fragmentary vertical sectional view through one of the container dispensers, taken on the plane 14—14 of Fig. 13.

The aforedescribed filling and capping mechanism are arranged to perform their respective operations at a relatively high rate of speed. In order to properly supply containers to this mechanism, there are provided a plurality of individual container dispensers, here shown three in number and designated 22a, 22b and 22c. The individual cup dispensers are formed in a common supporting plate 161, which plate, as best shown in Figure 2, is vertically adjustably mounted on a bracket 162 carried by the main support frame 28. The support plate 161 has a plurality of openings 164 formed therein of a diameter to loosely receive the stack of cups or containers, and guide rods 165 extend upwardly from the support plate around each opening to form magazines for the cups. The support plate 161 is chambered around each of the openings 164 therein and a cover plate 167 (see Fig. 14) is attached to the under side of the support plate to define an enclosed chamber therewith. A plurality of pinion gears 168 are disposed between the support plate 161 and the cover plate 167 and are circumferentially spaced around each of the openings 164. The pinion gears 168 each mesh with an internally toothed ring gear 169. A container dispensing cam 171 is connected to each of the pinions 168 for rotation therewith, which cams project slightly inwardly of the opening 164 below the support plate so as to normally support the lip on the lowermost container in the stack. The cams 171 are each formed with a helical groove 172 dimensioned to receive the lip on the lowermost container and urge the latter downwardly thereby removing the lowermost container from the stack as the cams are rotated.

As best shown in Figure 13, the ring gears 169 in the dispensers 22a and 22b are driven from a drive pinion 173 which meshes with teeth formed on the external periphery of these ring gears. The ring gear 169 and the dispenser 22b also meshes with an idler pinion 174 which drives the ring gear 169 on the dispenser 22c. In this manner, the dispensers 22a—22c are each driven in timed relation with each other and, preferably, the cup dispensers are arranged to operate simultaneously to dispense a cup and deposit the same on a platform therebelow.

The cup dispenser drive is best shown in Figs. 2 and 7 and includes a vertically disposed shaft 176 which is journaled in the table 28 and has a sprocket 177 on the lower end thereof disposed in meshing engagement with the drive chain 154. An idler sprocket 178 is provided for maintaining proper tension on the drive chain 154. A gear 179 on the upper end of the shaft 176 meshes with a gear 181 carried by a stub shaft 182 journaled in the plate 183. The upper end of the stub shaft 182 is splined as indicated at 184 and slidably receives the internally splined fitting 185 which is connected to the drive pinion 173. In this manner, the drive pinion 173 is rotated in timed relation with the advance of the conveyor 21 and the drive pinion, as shown in Figure 13, drives the cup dispensers 22a and 22b, the last mentioned cup dispenser being operative to drive the dispenser 22c through the idler pinion 174.

As the ring gears 169 on the several cup dispensers are rotated, in a clockwise direction as viewed in Figure 13, the barrel type cams 171 which surround the dispensing openings 164 are operative to remove the lowermost cup from the stack and deposit the same on the plate 183 below the dispensers. As is apparent from Figure 1, the dispensers are each located externally of the conveyor and the cups are deposited on the platform 183 out of the path of movement of the conveyor. The cups deposited below the dispensers 22a—22c are then moved simultaneously onto the container support platform 31a between the teeth 68 on the conveyor. For this purpose, sweeper arms designated 191a—191c (see Fig. 1) are mounted on vertically disposed shafts 192a—192c, which shafts are rotatably journaled in the support table 28 and project through the platform 183. The shafts 192a—192c are each disposed alongside the respective cup dispensers 22a—22c so that the arms 191 carried thereby will sweep the cup discharged by the respective dispenser from the platform 183 onto the container support platform 31a. The sweeper arms 191 are driven in timed relation with the conveyor and so arranged that the sweeper arms are moved through one revolution in the time required for three successive pockets on the conveyor to advance thereby whereby each sweeper arm is operative to move a dispensed cup into every third pocket on the conveyor. The drive for the sweeper arms is best shown in Figures 2 and 7 and includes a sprocket 194 on the shaft 176, and a chain 195 which is entrained around the sprocket 194 and drives the sprockets 196 and 197 on the sweeper arm shafts 192a and 192b respectively. The aforementioned sprockets and chains 194—197 are, as best shown in Figure 2, disposed below the table 28. A sprocket 198 is mounted on the shaft 192b, above the table 28, and drives a chain 199 which meshes with a sprocket 200 on the shaft 192c.

In order to supply syrup to the syrup dispensing nozzle, under pressure, there is provided a syrup pump 210, which pump, as shown in Figure 2, is disposed below the table 28 and mounted on the support legs 29. This pump is driven from a separate power take-off shaft 211 (see Fig. 7) on the speed reducing mechanism 51 by way of a belt 212 which is entrained over pulleys 213 and 214 on the speed reducing mechanism and on the pump drive shaft respectively. A bevel gear 215 (see Fig. 2) is mounted on the lower end of the shaft 176 and meshes with a bevel gear 216 which drives an auxiliary drive shaft 217 provided to operate any auxiliary equipment such as conveyors and the like.

From the foregoing it is thought that the operation of the device will be readily understood. The conveyor 21 and each of the cup dispensers 22, the fillers 23 and capping mechanism 25 are driven continuously and in timed relation with each other. The barrel cams 171 on the cup dispensers 22a—22c are operated to substantially simultaneously dispense a cup from the respective stacks and the sweeper arms 191a—191c are operated to move the dispensed cups onto the conveyor 21. In the embodiment shown wherein are provided three separate cup dispensing mechanisms, each cup dispenser and sweeper arm is operated to dispense and move a cup into every third pocket on the conveyor. The cups on the support platform 31a and 31b are advanced by engagement with the pusher plate 121 on the teeth 68 of the conveyor and are sequentially moved past the filler mechanisms 23a and 23b, past the cover magazine 24 and thence past the cap applying mechanism 25a and 25b.

The filler valve 23a is driven by mechanism internally of the housing at a speed such that the outer valve member 83 moves through substantially one quarter revolution in the time required for one pocket on the conveyor to move thereby. The discharge port 91 and the passages 84 in the filler valve are so arranged that the filler valve 23a begins to dispense ice cream or other semi-solid material into the container 20 when the container is in a position in advance of a position directly below the filler nozzle. The filler valve continues to dispense material into the container as it moves therebelow and, when the container is directly below the filler nozzle, the latter extends into the container and forces the semi-solid material outwardly thereby more evenly distributing the same in the container. The outer valve member 83 continues to rotate as the container moves away from the filler valve and reaches a position in which the discharge passage 84 moves out of registration with the port 91 and shuts off the flow of material to the container. In this manner, the container is filled with semi-solid material while the container is in motion.

The container is then moved below the filler valve 23b which, in the embodiment illustrated, is arranged to dispense syrup or similar confection onto the top of the material in the container. Since only a relatively small quantity of syrup is dispensed into each container, the port 91b is made relatively small. Further, the discharge passage 84b is provided with a relatively sharp edge to provide a sharp cut-off of the flow of syrup and prevent dripping.

As previously described, each of the teeth 68 on the conveyor also have cover stripping fingers 122 provided thereon, which fingers are arranged to engage the lowermost cover in the cover magazine 24 and move the latter off the lower end of the stack. As the container moves below the cover magazine, the arms 125 and 126 serve to radially center the container with respect to the cover magazine and the resilient fingers 135 on the cover magazine press the cover downwardly onto the container as shown in Figure 9. The teeth 68 on the conveyor also have an anvil 123 provided thereon which anvil is arranged to overlie the upper edge of the container and support the withdrawal tang of the cover thereon. The covers are carried in the position shown in Figure 9 to a position below the first cap applying mechanism 25a. The first cap applying mechanism is operative to lightly press the cover onto the container and bend up the withdrawal tang on the cover. Any air compressed in the container below the cover is allowed to escape as the container is moved to a position below the succeeding cap applying mechanism 25b which cap applying mechanism, as shown in Figure 10, is operative to completely seat the cover on the container. The conveyor then moves the filled and covered container onto the turntable 26, the stripper arm 155 being operative to move the containers out of the pockets on the conveyor 21. The turntable 26 is rotated in timed relation with the conveyor and carries the filled and covered containers away therefrom.

We claim:

1. A filling machine comprising an annular conveyor, an enclosed housing disposed centrally of said conveyor and extending thereabove, a filler and a cover applying mechanism mounted at circumferentially spaced points on said housing and overlying said conveyor, means for rotating said conveyor, and means disposed within said housing for operating said filler and said cover applying mechanism in timed relation with said conveyor.

2. A filling machine comprising an annular conveyor, an enclosed housing disposed centrally of said conveyor and extending thereabove, a filler and a cover applying mechanism mounted at circumferentially spaced points on said housing and overlying said conveyor, means for rotating said conveyor, means disposed within said housing for operating said filler and said cover applying mechanism in timed relation with said conveyor, a cup dispenser disposed externally of said conveyor, means operable to move a cup dispensed by said dispenser onto said conveyor, and means for operating said dispensing means and said cup moving means in timed relation with said conveyor.

3. A filling machine comprising an annular conveyor, an enclosed housing disposed centrally of said conveyor and extending thereabove, a filler and a cover applying mechanism at circumferentially spaced points on said housing and overlying said conveyor, means for rotating said conveyor, means disposed within said housing for operating said filler and said cover applying mechanism in timed relation with said conveyor, a plurality of circumferentially spaced cup dispensers disposed externally of said conveyor, means associated with each dispenser for moving the cup disposed thereby onto said conveyor, means for simultaneously operating each of said cup dispensers, and means operated in timed relation with said conveyor for simultaneously operating each of said cup moving means to advance a plurality of cups onto the conveyor.

4. A filling machine comprising an annular conveyor, an enclosed housing disposed centrally of said conveyor and extending thereabove, a first shaft mounted on said housing and extending horizontally outwardly therefrom, a filler comprising an outer cup-shaped valve member attached to said first shaft for rotation therewith, an inner valve member extending into said outer member and having a port therein opening at the underside thereof, said outer valve member having a plurality of circumferentially spaced discharge passages adapted to register with said port as the outer member is rotated, a second shaft mounted in said housing at a point circumferentially spaced from said first shaft, a capping mechanism operatively connected to said second shaft, means for rotating said conveyor, and means disposed within said housing for driving said first and second shafts in timed relation with said conveyor.

5. A filling machine comprising a central housing, an annular carrier rotatably mounted on said housing and extending outwardly therefrom, a filler mounted on said housing and overlying said carrier, a capping mechanism mounted on said housing and overlying said carrier, a stationary support frame, a container support platform diposed below said carrier and mounted on said frame independent of said housing, means disposed within said housing for operating said carrier, said dispenser and said capping mechanism in timed relation, and means for selectively elevating and lowering said housing relative to said frame to thereby adjust the spacing between said platform and each said carrier, said filler and said capping mechanism to accommodate different size containers.

6. A filling machine comprising a support frame, a container support platform mounted on said frame, a housing, means mounting said housing on said frame for vertical adjustment relative to said platform, an annular carrier rotatably mounted on said housing and extending outwardly therefrom above said platform, a filler mounted on said housing for vertical adjustment therewith, a cover magazine mounted on said housing for vertical adjustment therewith and circumferentially spaced from said filler, a cover applying mechanism mounted on said housing for vertical adjustment therewith and circumferentially spaced from said magazine, drive means, means disposed within said housing for operatively connecting said filler, said carrier and said cover applying mechanism to said drive means to operate the same in timed relation with each other, and means on said carrier for engaging and removing the lowermost cover in said magazine as the carrier moves thereby.

7. The combination of claim 6 including a container dispenser mounted on said frame externally of said carrier, and means for operating said container dispenser in timed relation with said carrier.

8. A filling machine comprising a support frame, a container support platform mounted on said frame, a housing, means mounting said housing on said frame for vertical adjustment relative to said platform, an annular carrier rotatably mounted on said housing and extending outwardly therefrom above said platform, a filler mounted on said housing for vertical adjustment therewith, a cover magazine mounted on said housing for vertical adjustment therewith and circumferentially spaced from said filler, a cover applying mechanism mounted on said housing for vertical adjustment therewith and circumferentially spaced from said magazine, drive means, means disposed within said housing for operatively connecting said filler, said carrier and said cover applying mechanism to said drive means to operate the same in timed relation with each other, means on said carrier for engaging and removing the lowermost cover in said magazine as the carrier moves thereby, a pair of guide arms attached to said cover dispenser and extending therefrom in the direction of movement of the carrier, and means on the arms for engaging the containers and covers as they are advanced by the carrier to guide the covers into interfitting relation with the containers.

9. The combination of claim 8 wherein one of said guide arms has a groove formed in the inner face thereof for receiving one edge of the cover, and means on said magazine disposed between said arms for yieldably urging the cover downwardly.

10. A filling machine comprising a support frame, a container support platform mounted on said frame, a housing, means mounting said housing on said frame for vertical adjustment relative to said platform, an annular carrier rotatably mounted on said housing and extending outwardly therefrom above said platform, a filler mounted on said housing for vertical adjustment therewith, arms on said carrier each arranged to engage a container and advance the same along said platform, a cover magazine mounted on said housing and arranged to support disk type covers having an integral tang thereon, means on each of said arms on said carrier for engaging the lowermost cover in the magazine adjacent opposite sides of the withdrawal tang and for removing that cover from the magazine, said arms on said carrier having an anvil formed thereon arranged to overlie the upper edge of the container moved by the respective arm on the carrier to support the withdrawal tang of the cover, a cover applying mechanism mounted on said housing and including a vertically movable plunger, means in said housing for operating said plunger in timed relation with said conveyor to move the plunger downwardly into engagement with said cover and across said anvil to bend the withdrawal tang on the cover prior to seating of the cover on said container.

11. A container filling machine comprising a conveyor having a plurality of spaced arms thereon for advancing containers, a filler mounted adjacent said conveyor, a cover magazine mounted adjacent said conveyor and spaced from said filler, said cover magazine being arranged to support disk type covers having an integral withdrawal tang, means on each of said arms on the conveyor for engaging the lowermost cover in the magazine at opposite sides of the withdrawal tang to remove the same from the magazine, said arms each having an anvil arranged to overlie the upper edge of the container as it is advanced by the respective arm and support the withdrawal tang of the cover thereon, a cover applying mechanism including a plunger mounted adjacent said magazine for vertical movement, and means for operating said plunger in timed relation with said conveyor to move the plunger downwardly into engagement with a cover and across said anvil to bend the withdrawal tang on the cover prior to seating of the cover on the container.

12. The combination of claim 11 including guide arms mounted on said magazine and extending therefrom toward said plunger, and means on said guide arms for engaging the container and cover advanced by each respective arm to guide the same into interfitting relation.

13. A container filling machine comprising a conveyor having a plurality of spaced arms thereon for advancing containers, a filler mounted adjacent said conveyor, a cover magazine mounted adjacent said conveyor and spaced from said filler, said cover magazine being arranged to support disk type covers having an integral withdrawal tang, means on each of said arms on the conveyor for engaging the lowermost cover in the magazine at opposite sides of the withdrawal tang to remove the same from the magazine, said arms each having an anvil arranged to overlie the upper edge of the container as it is advanced by the respective arm and support the withdrawal tang of the cover thereon, a cover applying mechanism including a first plunger mounted adjacent said magazine for vertical movement into and out of engagement with the covers as they are advanced by the arms on the conveyor, means for operating said first plunger in timed relation with said conveyor to move the same downwardly across the anvil and in the direction of movement thereof to bend the withdrawal tang on the cover and loosely seat the cover in the container, and a second plunger spaced along the conveyor from the first plunger and operated in timed relation with the conveyor to engage the cover previously engaged by the first plunger and seat the same on the container.

14. A container filling machine comprising a conveyor having a plurality of spaced arms thereon for advancing containers, a filler mounted adjacent said conveyor, a cover magazine mounted adjacent said conveyor and spaced from said filler, said cover magazine being arranged to support disk type covers having an integral withdrawal tang, means on each of said arms on the conveyor for engaging the lowermost cover in the magazine at opposite sides of the withdrawal tang to remove the same from the magazine, said arms each having an anvil arranged to overlie the upper edge of the container as it is advanced by the respective arm and support the withdrawal tang of the cover thereon, a cover applying mechanism including a plunger mounted adjacent said magazine for vertical movement, and means for moving said plunger downwardly and in the direction of movement of the conveyor across said anvil to bend the withdrawal tang on the cover, said last mentioned means moving said plunger in the direction of movement of said conveyor at a more rapid rate to thereby move the container and cover away from the anvil as the cover is pressed into the container.

15. A filling machine comprising a conveyor for continuously advancing containers, a filler mounted adjacent said conveyor for filling each of the containers while they are advanced by the conveyor, a cover applying mechanism mounted adjacent said conveyor for applying covers to each of the containers while they are advanced by the conveyor, means for continuously advancing said conveyor, means for operating said filler and said cover applying mechanism in timed relation with the advance of said conveyor to effect filling of each of the containers as they are advanced past the filler and to effect capping of each of the containers as they are advanced past the cover applying mechanism, a plurality of container dispensers mounted adjacent said conveyor and spaced therealong, and means for simultaneously operating all of said container dispensers in timed relation with said conveyor to thereby feed a plurality of containers to said conveyor while the conveyor is in motion.

16. A filling machine comprising a conveyor for advancing containers, a filler having a discharge opening overlying said conveyor for dispensing into the container carried by the conveyor, a cover applying mechanism mounted to overlie said conveyor to apply covers to the containers as they are moved by the conveyor, means for operating said filler and said cover applying mechanism in timed relation with the advance of said conveyor to effect filling of each of the containers as they are advanced past the filler and to effect capping of each of the containers as they are advanced past the cover applying mechanism, a plurality of container dispensers mounted alongside said conveyor and spaced therealong, means for simultaneously operating all of said dispensers in timed relation with the conveyor to dispense a plurality of containers, and means operable in timed relation with said dispensers for simultaneously moving all of the containers dispensed by said dispensers onto the conveyor.

17. A filling machine comprising an annular conveyor, an enclosed housing disposed centrally of said conveyor and extending thereabove, a shaft mounted on said housing and extending horizontally outwardly thereof above said conveyor, a rotary filler valve comprising an annular outer member open at one end and having a plurality of circumferentially spaced discharge passages therein, means detachably connecting the other end of said outer member to said shaft for rotation therewith, an inner member extending into the open end of said outer member and having a port therein adapted to register with the passages in the outer member as the latter is rotated, means for non-rotatably supporting the inner member on said housing, conduit means communicating with the end of said inner member remote from said shaft for supplying material thereto, means for driving said conveyor, and means within said housing for driving said shaft in timed relation with said conveyor.

18. A filling machine comprising a support frame, a platform mounted on said frame, a housing, means mounting said housing on said frame for vertical adjustment relative to said platform, an annular carrier rotatably mounted on said housing and extending outwardly therefrom above said platform, a shaft rotatably mounted in said housing and extending horizontally outwardly therefrom, a rotary filler valve comprising an annular outer member open at one end and having a plurality of circumferentially spaced discharge passages, means detachably coupling the other end of said outer member to said shaft for rotation therewith, an annular inner member extending into the open end of said outer member and having a port therein adapted to register with the passages in the outer member as the latter is rotated, means for non-rotatably supporting said inner member on said housing, conduit means communicating with the end of said inner member remote from said shaft for supplying material thereto, and means within said housing for driving said shaft in timed relation with said conveyor.

19. The combination of claim 18 wherein said outer member has lips formed thereon around each of the discharge passages and extending radially outwardly from the outer member, said lips being arranged to extend into the containers as the latter are advanced past the filler.

20. A filling machine comprising a conveyor, a support disposed adjacent one side of said conveyor, a shaft mounted on said support for rotation about a horizontal axis extending transverse to the direction of movement of the conveyor, an outer hollow valve member attached to said shaft for rotation therewith and having an opening at the end thereof opposite said shaft, an inner valve member rotatably received in said outer member, conduit means communicating with the end of said inner member remote from said shaft, means attached to said inner member for non-rotatably supporting the same, said inner member having a port in the underside thereof, a plurality of annularly spaced nozzles on said outer member each adapted to register with the port in said inner member as the outer member is rotated relative thereto, and means for driving said shaft to rotate said outer member.

References Cited in the file of this patent
UNITED STATES PATENTS
1,850,522    Wessman _____ Mar. 22, 1932